(No Model.)
B. F. HOLADAY.
CLOD CRUSHER OR ROLLER FOR LISTED CORN.
No. 367,399. Patented Aug. 2, 1887.
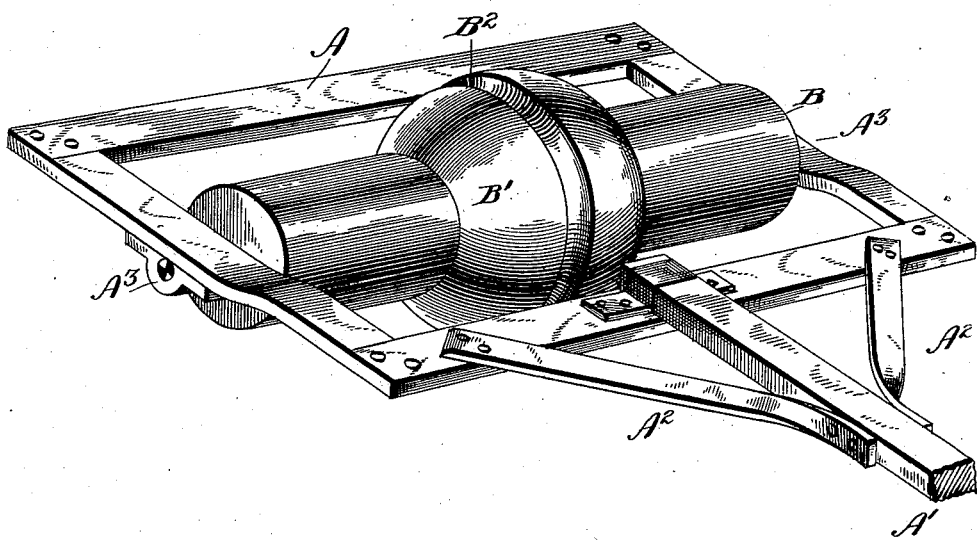
WITNESSES:
INVENTOR:
B. F. Holaday
BY
E. B. Stocking
ATTORNEY.

UNITED STATES PATENT OFFICE.

BENJAMIN F. HOLADAY, OF BLAINE, KANSAS.

CLOD-CRUSHER OR ROLLER FOR LISTED CORN.

SPECIFICATION forming part of Letters Patent No. 367,399, dated August 2, 1887.

Application filed April-19, 1886. Serial No. 199,288. (No model.)

*To all whom it may concern:*

Be it known that I, BENJAMIN F. HOLADAY, a citizen of the United States, residing at Blaine, in the county of Pottawatomie, State of Kansas, have invented certain new and useful Improvements in Clod-Crushers or Rollers for Listed Corn, of which the following is a specification, reference being had therein to the accompanying drawing.

This invention has relation to clod-crushers of that class adapted to be rolled along furrows wherein corn or other cereals have been planted; and it is especially adapted for the purpose of crushing clods in furrows containing corn which has been planted after the manner known as "listing."

The object of the invention is to provide a crusher so constructed as to fit the furrow, and to pass therealong, crushing the clods of earth at each side and top thereof, and leaving unmolested the corn planted therein, so that a harrow may afterward be used to destroy the weeds and stir up the soil thus crushed.

Other objects and advantages of my invention will appear in the following description, and the novel features thereof will be particularly pointed out in the claims.

Referring to the drawing, which is a perspective of a clod-crusher constructed in accordance with my invention, A represents the rectangular frame-work, which may or may not be secured together by means of bolts, said frame-work being either of metal or wood, as desired. To the front of the frame A is secured by bolts an ordinary draft-bar, A', which is held in a rigid position by means of diagonal braces $A^2$, extending therefrom to the frame-work.

B represents a roller of either metal or wood, and of a size adapted to fit the furrow or list at its bottom, sides, and top, and of a sufficient weight to effectually crush any clods therein turned up by the plows.

The roller or clod-crusher B is mounted or journaled on the frame-work A, as at $A^3$, and is provided at its center with an enlarged spherical portion, B', which, if desired, may be in the form of a double cone—that is to say, having its sides straight upon its circumference. Formed in the enlargement or sphere B', and at its center and extending completely around the same, is an annular groove, $B^2$, whereby the crusher is adapted to be rolled along within the furrow and thoroughly crush every part thereof, except in that portion in which the grain is planted.

It will be seen from the above description that a clod-crusher thus constructed may be passed over the list or furrows, and the soil at the sides and top of said list will be closely packed around the grain, and all clods thoroughly crushed. By reason of the annular groove in the middle of the enlargement B' the grain within the list will not be disturbed. After this operation has been performed, a harrow adapted for the purpose may, if desired, be passed over the list, thus stirring and more thoroughly pulverizing and loosening the earth around the corn.

I do not confine my invention to the exact construction herein illustrated, but I may use the same in any manner or to any extent within the scope of my invention.

Having described my invention and its operation, what I claim is—

1. A clod-crusher consisting of a frame-work, and having a roller mounted therein adapted to fit the furrow or list, and having a central annular groove, substantially as specified.

2. A clod-crusher comprising a roller mounted in a frame-work and provided at its middle with an enlargement annularly grooved, substantially as specified.

3. The frame A, having the draft-bar A', the roller B, journaled in said frame and formed with the enlargement B', and grooved, as at $B^2$, substantially as specified.

In testimony whereof I affix my signature in presence of two witnesses.

BENJAMIN F. HOLADAY.

Witnesses:
MICHAEL LEONARD,
JAMES CLATEN.